April 7, 1970  G. L. WALLIS  3,504,934
TRICYCLE WHEEL AND FRAME ARRANGEMENT
Filed June 30, 1966  5 Sheets-Sheet 1

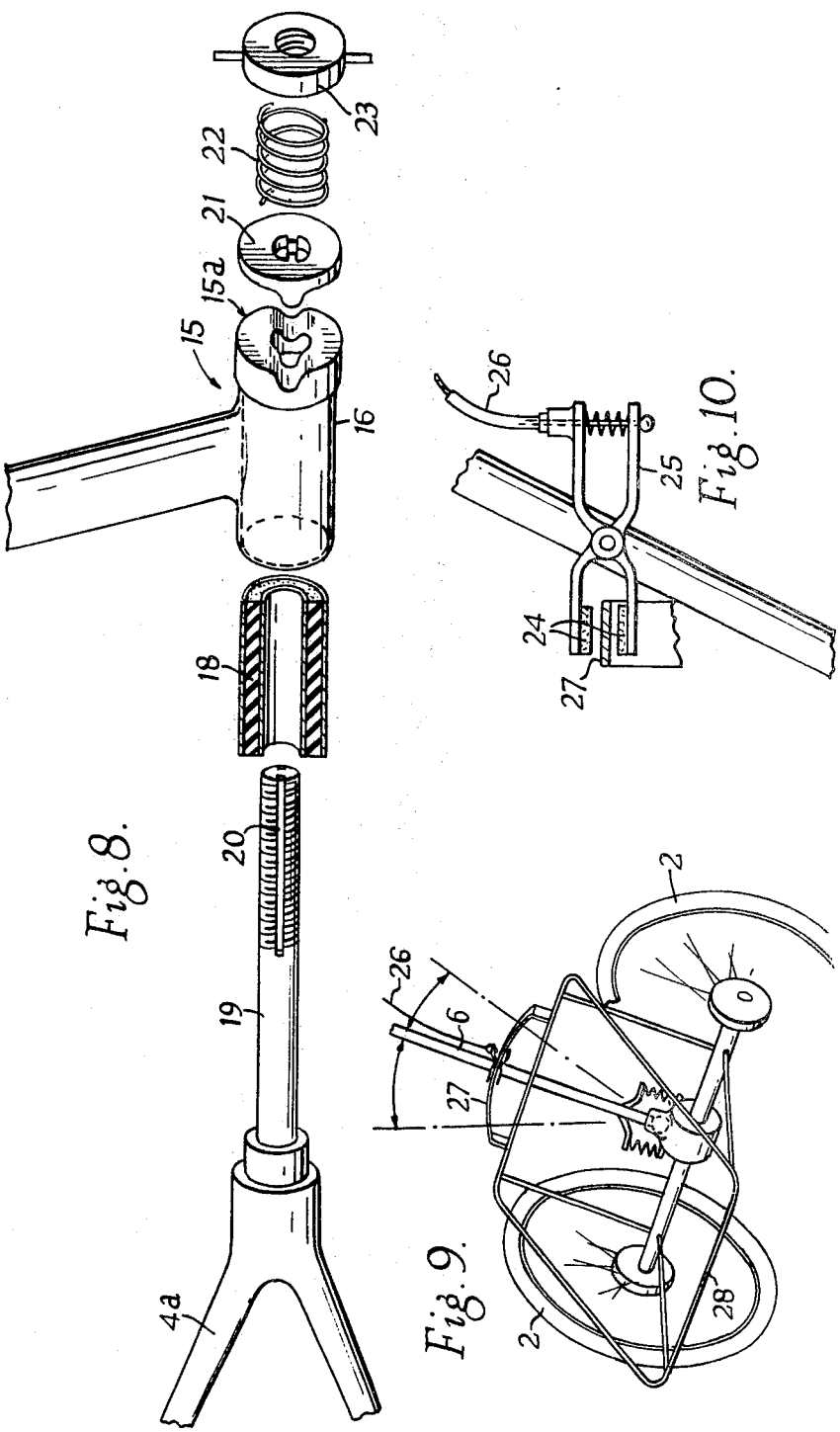

United States Patent Office 3,504,934
Patented Apr. 7, 1970

3,504,934
TRICYCLE WHEEL AND FRAME ARRANGEMENT
George L. Wallis, 74 Lenelby Road, Tolworth,
Surbiton, England
Filed June 30, 1966, Ser. No. 561,810
Int. Cl. B62k *11/02, 19/06*
U.S. Cl. 280—282                                6 Claims

ABSTRACT OF THE DISCLOSURE

A tricycle vehicle with a single front wheel and two co-axial rear wheels, in which the steerable front wheel and rider's seat are mounted on a main frame and the rear wheels are mounted on a rear sub-frame assembly, this assembly being connected by a pivot joint to the main frame the axis of which joint is positioned on a line such that when the main frame is tilted laterally, the sub-frame assembly and with it the rear wheels are turned on a vertical axis to effect steering of the rear wheels in accordance with the degree and direction of tilt.

Background of invention

This invention relates to tricycle vehicles having a single steerable front wheel and a pair of rear wheels which rear wheels are mounted to rotate on a common transverse axis, these rear wheels being driven either by foot pressure, or by power means such as an internal combustion engine. It is well known that with such vehicles, when a rider is negotiating a curve or turning, there is a tendency for the inside rear wheel to lift due to the centrifugal force set up by the weight of the rider or load carried by the tricycle, this tendency increasing with speed and sharpness of the curve. Further, with known machines, as the rear wheels are on a transverse axis fixed in relation to the machine, turning of the machine causes scuffing or lateral rubbing of the tyres of the rear wheels when in contact with the ground.

An object of this invention is to provide a tricycle in which the natural tendency of a rider to lean in on a curve, as with a bicycle, can occur without the rider altering his position on the vehicle.

A further and important object of the invention is to provide a tricycle with a high safety factor in that when negotiating a curve even at speed there is little or no tendency for the inside wheel to lift from the ground. Yet another object is to provide a vehicle in which the rear wheels turn unitarily about a vertical axis so that they roll on a curved line which is in the intended direction of turning, whereby excessive tyre wear is obviated and greater stability obtained.

Summary of invention

The vehicle according to this invention comprises a front main frame, a single steerable front wheel mounted thereon, a seat for a rider supported by said main frame, a rear sub-frame assembly, a pair of rear wheels mounted on said assembly on a common transverse axis, a pivot joint connecting said main frame and rear sub-frame assembly to enable the main frame to tilt to the one side or the other when travelling round a bend in accordance with the leaning over of the rider, with the turning axis of said joint located on a line extending forwardly substantially from the vertical centre line of the rear wheel axis through the normal upright steering axis of the front wheel and off the point of ground contact of said front wheel, and stabilising means between the front main frame and rear assembly to yieldingly resist the lateral tilting of the main frame and to apply a downward force on the rear wheel which is on the inside of the curve when turning, said tilting causing the rear wheel on the outside of the bend to move forwardly with respect to the inside rear wheel.

Brief description of the drawings

The accompanying drawings illustrate preferred embodiments of the invention. In the drawings:

FIGURE 8 comprises views drawn to a larger scale of the parts forming the articulated joint illustrated in FIGURE 7, and FIGURES 9 and 10 are views illustrating means for retaining the cycle in an upright position when the latter is stationary on a cambered surface.

Description of preferred embodiments

Figure 1:
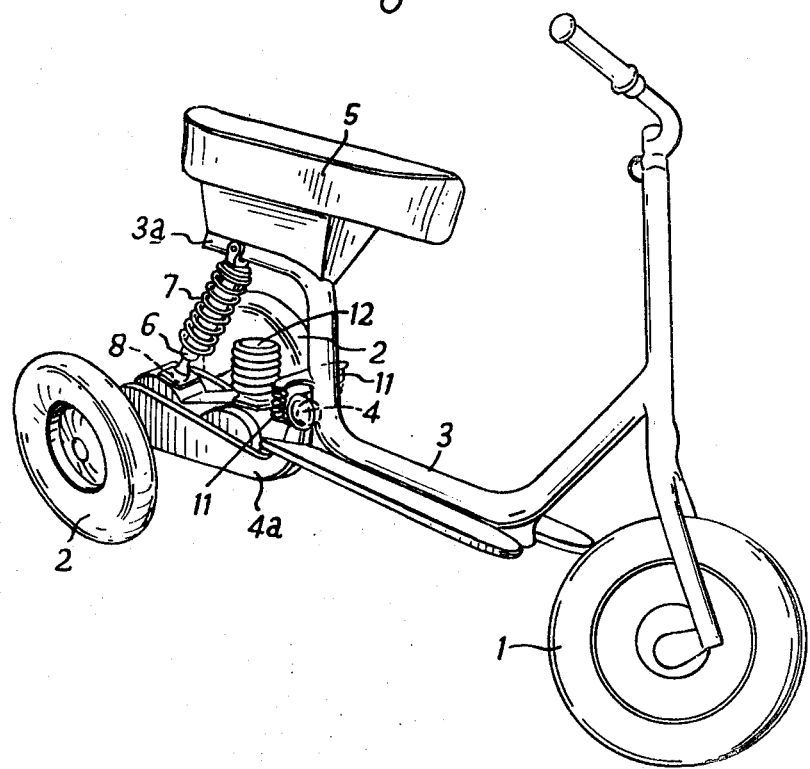
FIGURE 1 is a perspective view of a power assisted or propelled tricycle according to the invention.
Figure 2:
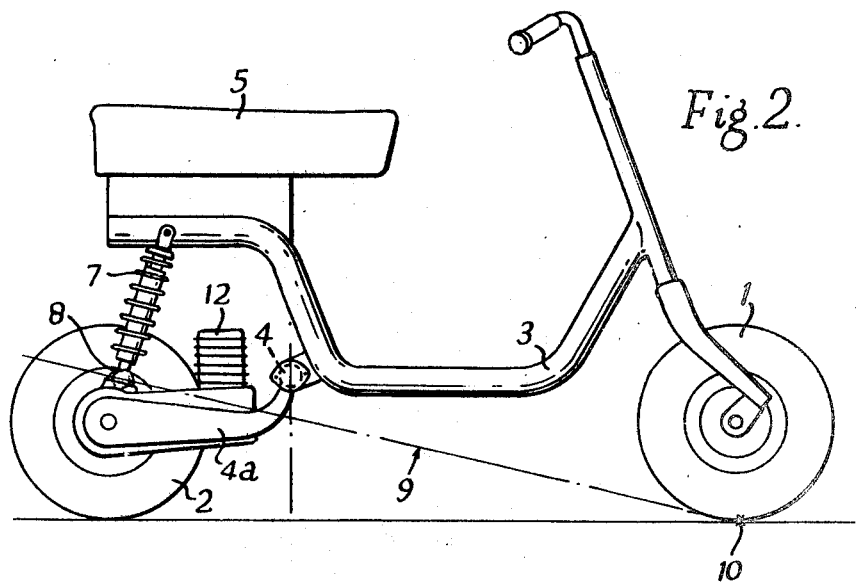
FIGURE 2 is a side elevation of FIGURE 1.

In the drawings, parts not essential to the invention, such as brakes, mudguards, controls and pedal drive, are not shown.

Referring firstly to the embodiment illustrated by FIGURES 1 to 4, the cycle illustrated is a power-assisted cycle but may alternatively be pedal propelled, and comprises a single front steerable ground wheel 1 and two rear ground wheels 2. The main frame is indicated generally at 3 and has a rear sub-frame assembly 4a articulated to it so that the said main frame can tilt either to the one side or the other with the rear wheels maintaining ground contact. As shown in FIGURES 1–5 the forward end of the sub-frame assembly 4a is connected to the main frame by a ball and socket joint 4. The socket of the joint may either be mounted at the forward end of the frame 4a and co-act with a ball provided on the adjacent part of the frame 3, or this arrangement can be reversed and the socket provided on the main frame and the ball at the forward end of the frame 4a.

The frame 3 extends upwardly and rearwardly as indicated at 3a below the saddle 5 and has connected to it the upper end of a saddle support tube 6 fitted with a shock absorber assembly 7, and which is connected to the rear part of the frame 4a above the rear axle by an articulated joint also preferably in the form of a ball joint 8.

Figure 3A:
FIGURE 3A is an end view showing the arcuate movement of the pivot joint.
Figure 3:
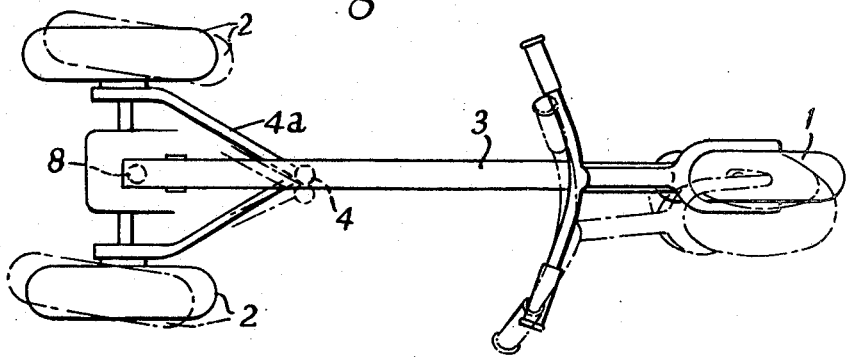
FIGURE 3 is a plan view.

When the main frame tilts, it turns on an axis passing through the ball and socket joints 4, 8. The axis of turning is a substantially linear axis, i.e. there is no substantial knuckling at the joint 4 which moves bodily laterally and arcuately as shown in FIGURE 3A, the main frame turning in relation to the sub-frame assembly on the axis abovementioned. The result is that the rear wheel which is on the outside with respect to the direction of tilt is moved forwardly so that the sub-frame assembly is turned slightly, as shown in FIGURE 3, to produce a steering action.

The degree of steering of the rear wheels depends on the height of the abovementioned axis above the ground and also its angle of inclination to the horizontal. It will be noted that the said angle of inclination of this line in the embodiments in FIGURES 1, 2, 4 and 5 above described, which are power driven machines, is less than that in the embodiment illustrated in FIGURE 7 which is a velocipede. It is, however, essential for this axis to pass above the point of ground contact of the front wheel. If this axial line passes through the said point of contact, then when the main frame tilts there is no steering of the rear wheels.

With the construction above described, when the machine is being ridden and negotiating, for example, a right hand bend, the rider leans over to the inside of the curve taking over the main frame 3, after the manner of riding a bicycle. Owing to the position of the pivot axis between the main frame and sub-frame assembly, the direction of travel of the rear wheels follows the direction of travel of the front wheel, so that the track of the front wheel virtually moves over towards the track now being taken by the outside rear wheel, as shown in FIGURE 3.

Figure 4:
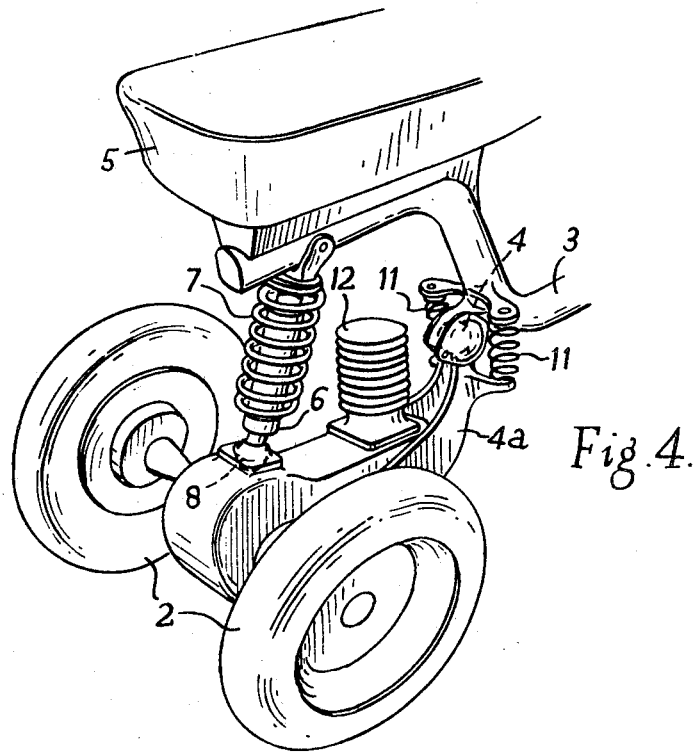
FIGURE 4 is a perspective view drawn to a larger scale showing the part of the cycle frame embodying the features of this invention.

Either or both of the ball joints 4 and 8 have stabiliser springs associated therewith. As shown in FIGURES 1 and 4, the stabiliser springs are compression springs indicated at 11 and are provided one respectively on each side of the ball joint 4. When negotiating a bend one or the other of these stabiliser springs 11 becomes compressed, and while yielding resisting tilting of the cycle frame, also exerts pressure on the rear wheel 2 which is on the inside of the curve or bend and acts to press this wheel against the ground and resists the tendency of this wheel to lift from the ground so that the cycle remains in a stable condition.

Figure 6:
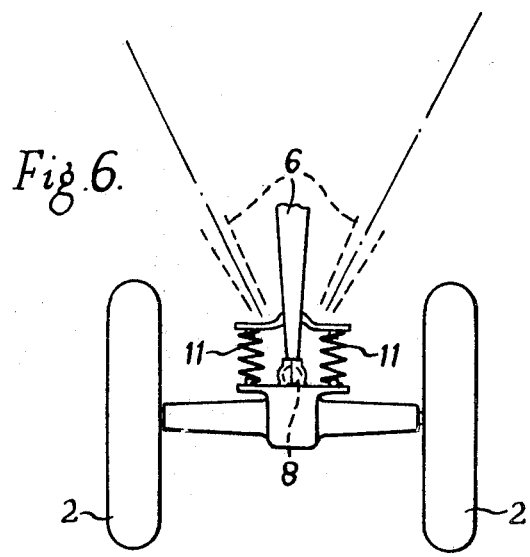
FIGURE 6 is a rear view illustrating a further modification.

Instead of associating the stabiliser springs 11 with the ball joint 4, such springs may be associated with the ball joint 8 above the rear axle as clearly shown in FIGURE 6.

Alternatively, or in addition to, the stabiliser spring may comprise the shock absorbing spring 7 which is located around the saddle tube 6.

The frame member 4a may be fairly substantial, as shown in FIGURES 1 and 4, so as to support a power unit 12, for example a small internal combustion engine, or alternatively, as shown in FIGURE 3, it may be of a less substantial nature, i.e. in the form of a wish-bone where the cycle is constructed for manual propulsion by pedals.

Figure 5:
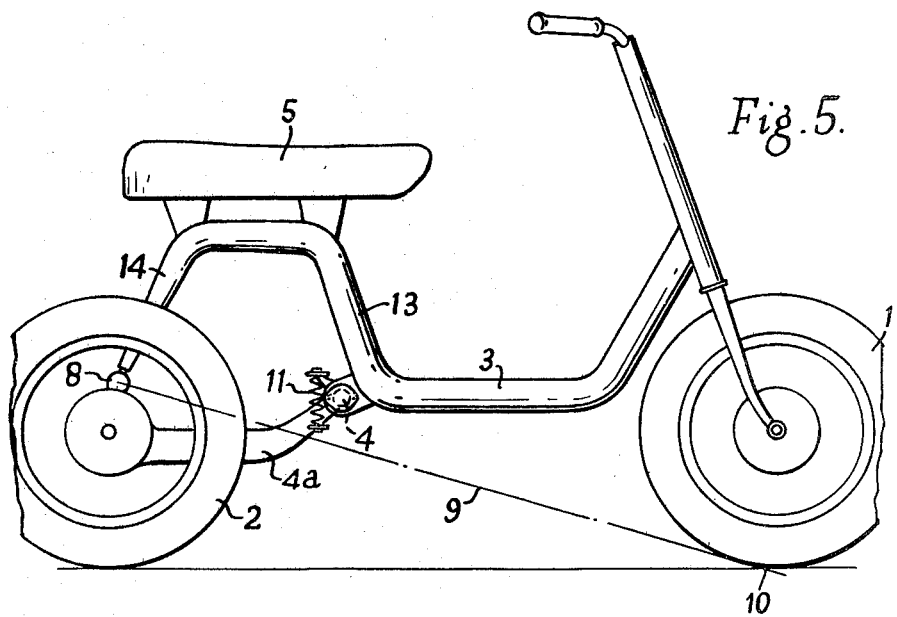
FIGURE 5 is a side view illustrating a modification.

Referring next to FIGURE 5, this illustrates a slight modification wherein the main frame 3 is extended upwardly as indicated at 13, and extends beneath the saddle 5 and terminates in a downwardly directed portion 14 which constitutes the saddle tube and which is provided at its lower end with the ball joint 8 which is mounted on or connected to means carried by the rear axle.

Figure 7:
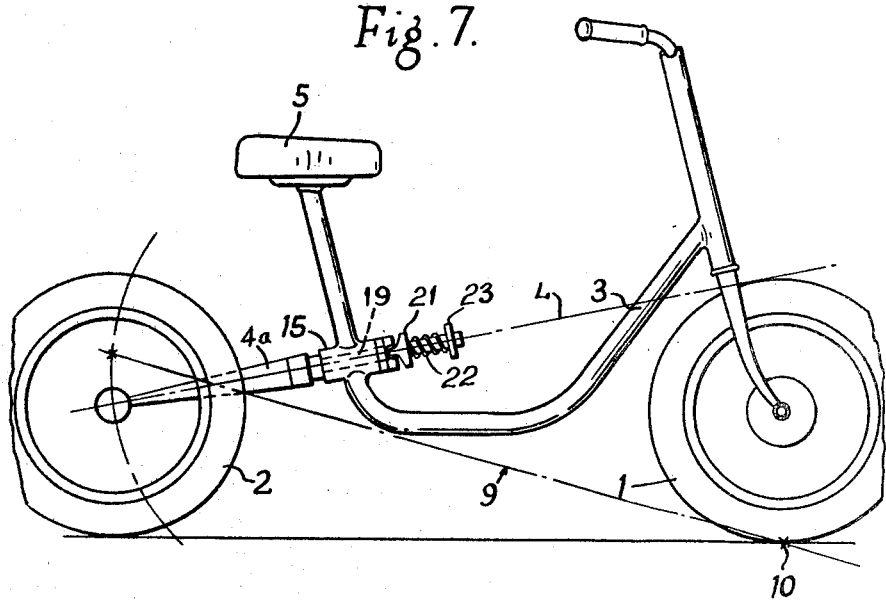
FIGURE 7 is a side view illustrating a different form of articulated joint to that shown in FIGURES 1 to 6.

Referring next to FIGURES 7 and 8, the construction shown is similar in principle to that described with reference to FIGURES 1 to 4, except that the pivot joint between the main frame and sub-frame assembly comprises an axial or sleeve-bearing 15 which, as clearly shown in FIGURE 8, comprises an outer metal sleeve 16 within which is located a hollow bush of rubber or equivalent resilient material 18. The frame member 4a, which may be in the form of a wish-bone, is formed with a forwardly directed spindle 19 formed with splines 20, and this spindle 19 extends through the bore in the rubber bush 18 and is fitted with a cam member 21 which engages the splines 20 and is therefore incapable of rotation relatively to the spindle 19. The cam member 21 is yieldingly retained in engagement with a complementary cam face 15a at the end of the metal sleeve 16 by a coiled compression spring 22 and an adjustable clamping collar or nut 23. The axis of turning of the spindle and sleeve bearing, similar to the axis of turning described with reference to the embodiment of FIGURES 1-5, is on a line passing through the steering column above the point of contact of the front wheel and ground.

As the cycle travels around a curve, the bearing 16, due to the tilting movement of the frame 3, turns slightly about its axis but no turning movement is imparted to the spindle 19 extending forwardly of the frame member 4a, and the latter is constrained to move laterally to cause the end of the axle of the wheel 2 at the outer side of the curve to move forwardly so that the rear wheels 2 are caused as indicated in FIGURE 3, to follow the direction of travel of the front wheel 1.

As the sleeve bearing 15 moves laterally to one side or the other according to the direction of the curve being negotiated, the centre of this bearing travels through an arcuate path as shown diagrammatically in FIGURE 3A previously referred to.

According to one modification (not illustrated) of the arrangement illustrated by FIGURES 7 and 8, the sleeve bearing 15 may be positioned on the rear axle.

According to another modification (not illustrated) the sleeve bearing 15 may be positioned forward of the back axle and behind the position illustrated in FIGURE 7.

Referring lastly to FIGURES 9 and 10 of the drawings, these views illustrate means for retaining the cycle frame in an upright normal position should the rider have need to stop the cycle on a cambered road, for example, at traffic lights. Such means comprises a pair of gripping jaws 24 actuated by scissor-like linkage 25 operable by a Bowden cable 26 which is controlled by a trigger (not shown) in an accessible position to the rider, for example, a trigger mounted on the handle bars of the cycle. These gripping jaws 24 are positioned one above and one below an arcuate bar 27 provided at the rear of the cycle. This bar 27 may be fitted to the rear of the cycle in any suitable manner and in the illustrated embodiment the bar 27 constitutes a part of a luggage carrier 28. When the cycle comes to rest on a cambered surface it will be appreciated that one of the rear wheels 2 will be lower than the other and that the bar 27 with the rear part of the cycle will slant laterally slightly in a direction towards the lower wheel with the front portion 3 of the cycle frame remaining upright. By actuating the gripping jaws 24 the bar 27 is gripped at an appropriate position along its length, and the front portion of the cycle becomes locked in an upright position with respect to the rear part. When proceeding, the rider releases the locking trigger and the cycle can be ridden normally. A consequential advantage of the bar 27 is that the end portions limit any excessive tilting of the cycle frame laterally.

Any of the combinations of the proposed arrangements may be used for different weights and sizes of cycles from a very small light-weight pedal cycle to a comparatively heavy and powerful motor cycle and even a racing cycle.

All arrangements provide for greater adhesion of the two small rear ground wheels with the ground resulting in greater safety being afforded to the rider.

With the general construction according to the invention, when the rider is negotiating a bend the main frame tilts over as with a bicycle, and also the outside rear wheel moves forwardly in accordance with the direction and degree of tilting. The stabilizing means also apply a downward pressure on the inside rear wheel, and as will be seen from FIGURE 3, the front wheel in effect moves over towards the track being taken by the outside rear wheel. Thus, there is little risk of the machine tipping over when travelling round a bend.

I claim:

1. A tricycle vehicle comprising a front main frame, a single steerable front wheel mounted thereon, a seat for a rider supported by said main frame, a rear sub-frame assembly, a pair of rear wheels mounted on said assembly on a common transverse axis, a pivot joint connecting said main frame to the forward portion of said rear sub-frame assembly at a point intermediate said front wheel and said rear wheels and above the horizontal plane passing through the said wheel axes to enable the main frame to tilt to one side or the other when travelling around a bend in accordance with the leaning over of the rider whereby said joint is laterally displaced toward the inside of said joint, the turning axis of said joint disposed on a longitudinal axis extending forwardly substantially from the vertical center line of said rear wheel axis through the normal upright steering axis of said front wheel and sloping upwardly from the rear of said vehicle to the front thereof, said tilting of said main frame laterally displacing said pivot to cause said rear wheel on the outside of the bend to move forwardly with respect to the inside said rear wheel, and resilient stabilizing means between the rear of said main frame and said rear assembly yieldingly resisting the lateral tilting of said main frame and applying a downward force on said rear wheel which is on the inside of the curve when said vehicle is turning and said pivot joint is laterally displaced.

2. A tricycle vehicle as claimed in claim 1, wherein the pivot joint comprises a ball and socket joint.

3. A tricycle vehicle as claimed in claim 1, wherein the pivot joint comprises a sleeve and spindle bearing.

4. A tricycle vehicle as claimed in claim 1, comprising additionally shock absorbing means between a rear part of the front frame and the rear sub-frame assembly.

5. A tricycle vehicle as claimed in claim 3, wherein the sleeve bearing comprises a resilient hollow part housed in said sleeve, a spindle extending forwardly from an axle of the sub-frame carrying the rear wheels and passing through said resilient hollow part, a cam face formed on the front end of said sleeve bearing and a spring loaded cam non-turnably mounted on the forward end of said spindle and co-acting with the cam face on the sleeve bearing.

6. A tricycle as claimed in claim 1, including means operable by the rider for locking the cycle frame in an upright position against lateral tilting.

References Cited

UNITED STATES PATENTS

| | | | |
|---|---|---|---|
| 2,792,234 | 5/1957 | Page | 280—112 |
| 2,878,032 | 3/1959 | Hawke | 280—282 |
| 3,206,223 | 9/1965 | Frye | 280—282 |
| 3,237,961 | 3/1966 | McMullen | 280—112 |

FOREIGN PATENTS

| | | |
|---|---|---|
| 408,719 | 1/1945 | Italy. |
| 1,158,922 | 2/1958 | France. |

KENNETH H. BETTS, Primary Examiner

U.S. Cl. X.R.

180—27; 280—112